United States Patent Office 3,560,591
Patented Feb. 2, 1971

3,560,591
POLYESTER COMPOSITION HAVING ANTISTATIC ABILITY CONTAINING POLYALKYLENE OXIDES AND ORGANIC SULFONIC ACID SALTS
Michihiko Tanaka, Sunto-gun, Shizuokz-ken, and Eiichi Hayashi and Rei Yokouchi, Mishima-shi, Japan, assignors to Toyo Rayon Kabushiki Kaisha, Tokyo, Japan
No Drawing. Filed May 9, 1967, Ser. No. 637,064
Claims priority, application Japan, May 13, 1966, 41/30,005; June 20, 1966, 41/39,609
Int. Cl. C08g $39/10$
U.S. Cl. 260—860
12 Claims

ABSTRACT OF THE DISCLOSURE

A polyester composition with an excellent antistatic property comprising polyester in which are incorporated at least one polyalkylene ether substantially insoluble in the polyester and at least one alkali metal salt or alkaline earth metal salt of an organic sulfonic acid having no ester-forming group. Among these salts, dodium salts, potassium salts and calcium salts of alkylbenzenesulfonic acids, alkyldiphenylether sulfonic acids and alkylphenoxyalkane sulfonic acids are preferable.

---

This invention relates to polyester compositions having an excellent antistatic ability.

It has been known that polyesters such as polyethylene terephthalate, its copolymers, poly-1,4-cyclohexanedimethylene terephthalate and its copolymers have a high crystallinity and high softening point and posses excellent properties in respect of tenacity, elongation, flexural strength, resistance to chemicals, light and to heat, showing a great commercial value. In spite of such merits, they have defects such as bad dyeability, tendency to static charge and to pilling, which make them partly restricted in their use. Especially, tendency to static charge is the most grave defect. When putting on a garment made from polyester, one often hears a cracking sound of the discharge of electricity, or sees the garment cling to himself owing to a high tendency of such garment to static charge, particularly in the state of low humidity. Furthermore, such garment tends to collect dust and becomes too dirty to wear for a long period of time. These static troubles are seen not only in fabrics composed of polyester fibers alone, but also in those fabrics composed of fiber blends consisting of polyester fibers and cotton, wool or rayon.

For these reasons, attempts have been made to minimise these static troubles by modifying polyester, and many proposals have been made as to the method of preventing static charge.

Heretofore, to improve the static charge of polyesters, there has been proposed a method of treating polyester fibers with quaternary ammonium salt or polyethylene imine (post-treatment method), a method of copolymerising N,N'-piperazine-dicarboxylic acid or alkylglycidyl ether with a monomer of polyester (copolymerisation method) or a method of incorporating a high molecular weight polyalkylene glycol into polyester and spinning the mixture (incorporating method). Every one of them, however, has some defects, and cannot be commercially practised with good results. For instance, the post-treatment method only gives an antistatic agent adhered to the surface of the fibers, which tends to be removed away by washing. The prolongation of the antistatic effect cannot be achieved. When an antistatic resin is coated on the surface of the fibers by the post-treatment method, the effect will be prolonged but the feeling of the product is remarkably impaired. The copolymerization or incorporating method is difficult to practise because an attempt to obtain a sufficient effect results in the deterioration of good hpysical properties of polyester or colouring of polyester. Especially, in the incorporating method, the incorporation of an antistatic agent into polyester gives rise to the lowering of the degree of polymerisation or colouring. Also, owing to filament breakage, it is generally difficult to form fibers from such blend, and if fibers can be formed, the tenacity of the fibers is not sufficient and the antistatic agent shows little or no antistatic ability.

Accordingly, an object of this invention is to provide a polyester composition by incorporating method capable of giving an outstanding antistatic effect without deteriorating excellent physical properties of polyester and with less influence upon the shaping process such as filament or film making.

This object of the invention can be achieved by incorporating into polyester (1) at least one polyalkylene ether which will be dispersed into polyester without substantially being dissolved therein and (2) at least one alkali or alkaline earth metal salt of an organic sulfonic acid having no ester-forming group.

The polyester to be used in this invention may either be a homopolyester or a copolyester. Examples of such polyester are homopolyesters such as polyethylene terephthalate (constituents being ethylene glycol and terephthalic acid), polyethylene adipate (constituents being ethylene glycol and adipic acid), polyethylene isophthalate (constituents being ethylene glycol and isophthalic acid) and poly-p-ethylene oxybenzoate (constituents being p-oxyethoxybenzoic acid) and copolyesters such as polyethylene terephthalate·isophthalate (constituents being ethylene glyclo, terephthalic acid, and isophthalic acid), polyethylene terephthalate·5-sodium sulfoisophthalate (constituents being ethylene glycol, terephthalic acid and 5-sodium sulfoisophthalic acid), and polyethylene terephthalate·p-oxyethoxybenzoate (constituents being ethylene glycol, terephthalic acid and p-oxyethoxybenzoic acid). Especially effective and preferable polyesters are those in which at least 70% of the acid component is terephthalic acid.

The polyalkylene ether to be used in this invention is substantially insoluble in polyesters. Specific examples are polyethylene glycol having a molecular weight of at least 4,000, polypropylene glycol having a molecular weight of at least 1,000, a copolymer of propylene glycol with ethylene glycol having a molecular weight of at least 1,500, polytetrahydrofuran having a molecular weight of at least 1,000, a copolymer of propylene oxide with tetrahydrofuran having a molecular weight of at least 1,000, a trimethylolpropane ethylene oxide addition product having a molecular weight of at least 2,000, methoxy polyethylene glycol having a molecular weight of at least 1,500, and a nonylphenol ethylene oxide addition product having a molecular weight of at least 1,000. In the polyalkylene ether, the terminal OH group may have another group via an ether or ester linkage, for instance. Especially preferable polyalkylene ethers are polyethylene glycol having a molecular weight in the range of 10,000 to 50,000 and an ethylene oxide/propylene oxide copolymer with a proportion of from 10/90 to 90/10 having a molecular weight of 6,000 to 20,000.

In the preparation of the composition of this invention, the time of addition of a polyalkylene ether to polyester is of particular importance, and it is necessary that care should be taken so that most of the additive may be insoluble in the polyester. Generally, it is convenient to mix a polyalkylene ether with polyester in a polymerisation vessel after the completion of polymerisation, or cutting polyester into small fragments and mixing them with a polyalkylene ether by means of a screw extruder. But if the polyalkylene ether has little or no functional groups to react with polyester, it is possible to mix it with the mass of polyester before or during the polymerisation reaction. Furthermore, when polyester is spun by means of a spinning apparatus provided with a screw type extruder, it is possible to add a polyalkylene ether to a polyester molten inside the spinning apparatus.

The organic sulfonic acid salt derivatives have, for example, the following structures.

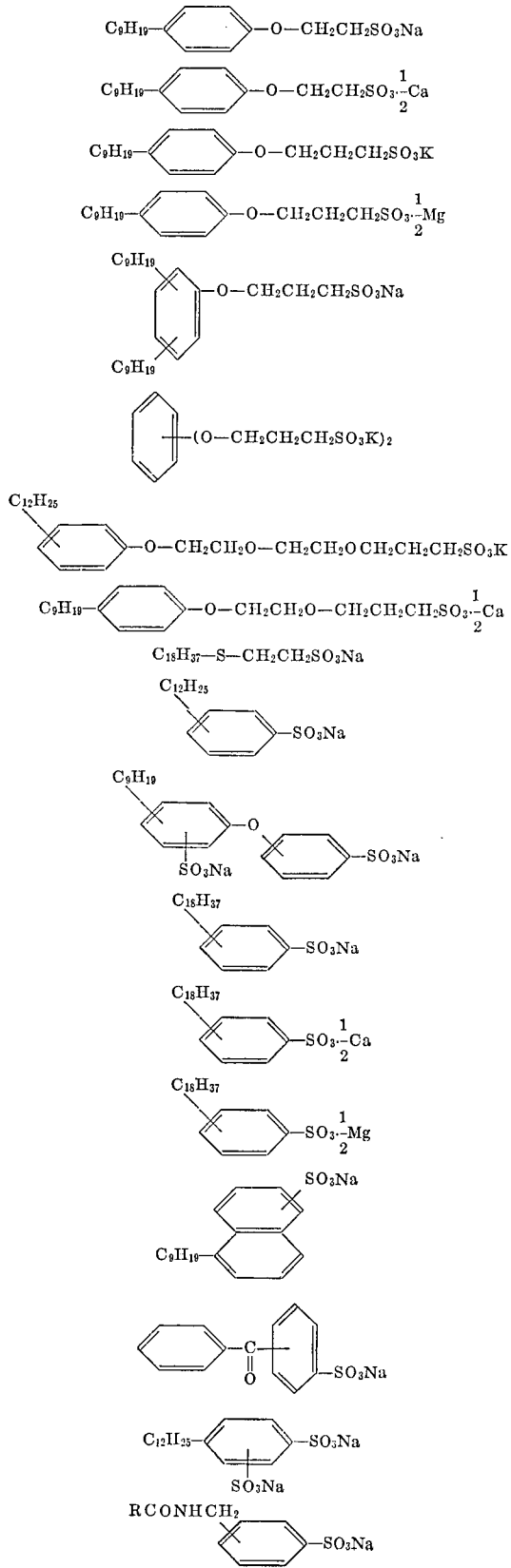

As shown above, there are many organic sulfonic acid salt derivatives usable for this invention, but when the low cost and remarkable effect are considered, the use of an alkylbenzene sulfonic acid salt represented by the general formula:

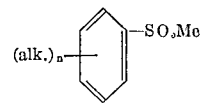

(wherein alk. is an alkyl group, $n$ is 1 or 2 and Me is an alkali or alkaline earth metal), an alkyldiphenyl ether sulfonic acid salt represented by the general formula:

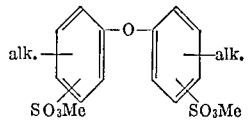

(wherein alk. and Me are the same as defined above) and an alkylphenoxy alkane sulfonic acid salt represented by the general formula:

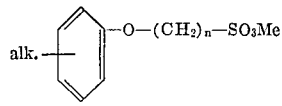

(wherein alk. and Me are the same as defined above, and $n$ is an integer of 1 to 4) is recommended. Preferable compounds that come within the said group are organic sulfonic acid salts having at least 10 carbon atoms in total, the examples of which are sodium, potassium and calcium salts of dodecylbenzenesulfonic acids, octadecylbenzenesulfonic acids, nonyldiphenylether sulfonic acids and noylphenoxyethane (or propane) sulfonic acids.

The manner of addition of these sulfonic acid salt derivatives to polyester is not particularly limited, but it is recommended to add them together with a polyalkylene ether. For this purpose, a prescribed mixture of a polyalkylene ether with a sulfonic acid salt derivative, for example, may be added to polyester. The addition of these sulfonic acid salt derivatives alone hardly gives effect. For instance, in a test of mixing on a large industrial scale, if an amount of said sulfonic acid salt derivative is increased to 5% which is the limit for not deteriorating the effective physical and chemical properties of polyester, or even to 10%, antistatic property is hardly exhibited. Furthermore, if polyalkylene ethers are added singly to polyester in an attempt to obtain satisfactory results, the amount should be at least 3%, preferably 5% and there is hardly any effect if such is used in an amount below 2%. Thus, the addition of a great quantity of polyalklene ether adversely affects the spinnability, and makes it difficult to carry out stable spinning and drawing. Even if there is no trouble during spinning, the occurrence of the so called monofilament breakage increases as compared with ordinary filaments and becomes the cause of fluffing. This fluffing in turn gives rise to a grave trouble in the process of spinning, knitting and weaving. In short, to obtain sufficient effects, it becomes necessary to add a great quantity of a polyalkylene ether, and such method is made possible only by the sacrifice of a stable production step.

As so far mentioned, both the said sulfonic acid salt derivatives and polyalkylene ethers hardly exhibit effect when used singly. We have, however, found to our surprise that when 0.1 to 10% by weight, preferably 0.1 to 5% by weight, based on the polyester, of the said sulfonic acid salt derivative and 0.3 to 5.0% by weight, preferably 0.5 to 2.0% by weight, based on the polyester, of a polyalkylene ether are added in combination to a polyester, the obtained composition exhibits a very effective antistatic ability. In addition, we have found that the addition of a combination of both hardly gives any adverse effect to the filament-making process, and the obtained filaments have excellent physical properties, and serviceable properties such as wash-and-wear property.

The details of the mechanism of static prevention by the said combination are not known, but it is presumed that a part of a sulfonic acid salt derivative is distributed in a polyalkylene glycol dispersed in a polyester matrix in the form of stripes and ionised, and that this ionised sulfonic acid salt derivative will serve for the dissipation of the generated static charge. A greater part of the sulfonic acid salt derivative present in the polyester matrix forming the essence of the fibers is diffused little by little at a certain speed, although maybe slowly, in the fibers, and the sulfonic acid salt derivative is incessantly supplied to the polyalkylene glycol. This considered to be the reason for the continuance of the antistatic effect.

Interestingly, it has been found that more excellent effects will be exhibited when the composition of this invention is prepared by first preparing a composition containing a polyalkylene ether and a sulfonic acid salt derivative in concentrated amount, stocking it beforehand, and if necessity arises, adding an appropriate amount of polyester thereto to dilute it so that the polyalkylene ether content may finally reach 0.3 to 5.0% by weight, particularly 0.5 to 2.0% by weight, and the sulfonic acid salt derivative content, 0.1 to 10% by weight, particularly 0.1 to 5% by weight than when the composition of this invention is prepared by mixing a polyalkylene ether and sulfonic acid salt derivative with polyester so that their proportion may be the range specified above from the beginning. This will be explained in one of the following examples.

When fibers, films and other shaped articles are manufactured from the polyester composition of this invention, a suitable photostabiliser, heat-stabiliser, delusterant, pigment or dyestuff can be incorporated just like an ordinary polymer composition. It is also possible to obtain fibers for special uses by composite-spinning or blend-spinning of the polyester composition of this invention together with other polyester or other polymer such as polyamide.

Antistatic polyester fibers to be obtained from the polyester composition of this invention can find application in various uses of conventional polyester fibers. Since they do not substantially accumulate static charge, the accident or uncomfortableness caused by the electric discharge are prevented. Moreover, they hardly catch dust, and their antistatic effect hardly decreases by the repetition of an ordinary washing.

The invention will now be described by means of the following examples, in which the frictional charge of filaments means the charge generated on a fabric piece made of the said filaments and having a width of 5 cm when it was fixed at both ends under the tension of 500 g. in an atmosphere of 40% RH at 20° C., and rubbed on one surface lightly 10 times with a rod around which wool was wound and the half life means a period necessary for the so generated voltage to decrease to ½ of the initial value.

EXAMPLE 1

Polyethylene terephthalate was prepared by an ordinary polymerisation method. After the completion of polymerisation, 1.5% by weight of polyethylene glycol having a molecular weight of 20,000 and 1.0% by weight of 3-nonylphenoxypropane sulfonic acid potassium salt were admixed with the polyester. The mixture was extruded through a polymerisation can in a customary manner, cooled and cut into chips. The polymer was spun and drawn in a customary manner to obtain filaments having a tenacity of 4.0 g./d. and an elongation of 22%. Both spinning and drawing were carried out in good condition. The obtained filaments were knitted, and boiled off in a customary manner. The static property of the said knitted article was measured, and it was found to have a friction charge of −450 volts and a half life of 4 seconds. The knitted article, when subjected to an ordinary washing five times, exhibited a charge of −500 volts and a half life of 5 seconds, and did not catch the ash of tobacco.

When the additives were not incorporated into the said polyethylene terephthalate, the obtained filaments had a tenacity of 4.3 g./d. and an elongation of 19.5%. A knitted and boiled fabric obtained from these filaments had a friction charge of −4,500 and a half life of more than 180 seconds, and vigorously caught the ash of tobacco.

EXAMPLE 2

Polyethylene terephthalate chips were kneaded with 2.0% by weight of polyethylene glycol having a molecular weight of 20,000 and 1.0% by weight of 3-nonylpheboxypropane sulfonic acid potassium salt by means of a screw extruder. Filaments were obtained from the resulting blend chips by a customary manner, and were found to have a tenacity of 3.9 g./d. and an elongation of 23%. When the same test as in Example 1 was performed with respect to a knitted fabric made from these filaments, it was found that it has a charge of −100 volts and a half life of 5 seconds, with no catching of the tobacco ash. Subsequently, the same test was carried out after the knitted fabric had been washed 10 times by an electric washer using a neutral detergent of alkylbenzene sulfonic acid series (made by Lion Yushi K.K.) in a concentration of 0.2 g./l., it was found to have a charge of −600 volts and a half life of 5 seconds, with no catching of ash.

EXAMPLE 3

Filaments A, B and C with a total denier of 50 and 24 monofilaments were prepared in a customary manner from ordinary polyethylene terephthalate chips (A), blend chips of Example 2 (B), and polyethylene terephthalate chips with which 2.5% by weight of polyethylene glycol having a molecular weight of 20,000 had been blended (C), respectively.

Eight hundred grams of each of filaments A, B and C was drawn while taking up at a rate of 300 m./min. The number of monofilament breakage seen during this period was 0 for filaments A, 1 for filaments B, and 15 for filaments C. When these filaments were rubbed vigorously with wool, filaments B did not catch an ash while filaments A caught a great deal of ash and filaments C also caught a considerable ash.

It can be understood from the above-mentioned tests that the composition (B) of this invention gives excellently antistatic filaments without adversely affecting the filament-making process.

EXAMPLE 4

In accordance with the procedure of Example 1, 1.8% by weight of polypropylene glycol and 0.7% by weight of 3-nonylphenoxyethanesulfonic acid sodium salt were incorporated into polyester. The filaments made from this composition had a tenacity of 4.3 g./d. and an elongation of 18%, and showed a charge of −900 volts and a half life of 6 seconds as measured in the same manner as in Example 1.

The filaments prepared from a composition obtained by blending polyethylene terephthalate with 2.0% by weight of polypropylene glycol having a molecular weight of 2,000 alone exhibited a charge of −3,800 volts and a half life of more than 180 seconds with no indication of antistatic ability. Furthermore, the filaments made from a polyethylene terephthalate composition containing 3.0% by weight of 3-nonylphenoxyethane sulfonic acid sodium salt alone did not show an antistatic effect.

EXAMPLE 5

The method of this invention was applied to polyethylene terephthalate·isophthalate which had been obtained by substituting isophthalic acid for 10 mole percent of the acid component of polyethylene terephthalate.

After the completion of polymerisation for polyethylene terephthalate·isophthalate, 1.5% by weight of methoxypolyethylene glycol having a molecular weight of 20,000 and 0.8% by weight of 3-nonylphenoxypropanesulfonic acid calcium salt were added thereto. Filaments could be prepared in good condition from the resulting composition. A knitted fabric made of these filaments had a complete antistatic property, and even after 10 times of washing, showed a charge of −800 volts and a half life of 7 seconds. On the other hand, filaments made from polyethylene terephthalate·isophthalate containing no such antistatic agent as above-mentioned showed a charge of −4,100 volts and a half life of more than 180 seconds.

EXAMPLE 6

Polyethylene terephthalate was prepared by a customary polymerisation method. After the completion of polymerisation, 1.5% by weight of polyethylene glycol having a molecular weight of 20,000 and 0.75% by weight of dodecylbenzenesulfonic acid sodium salt were admixed with the polyethylene terephthalate. The mixture was then extruded from a polymerisation can, cooled and cut in a customary manner to make chips. The spinning and drawing of these polymer chips gave filaments having a tenacity of 4.3 g./d. and an elongation of 19%. A knitted fabric was made of these filaments, and boiled off in a customary manner. The so treated knitted fabric, when measured with respect to its static property, was found to have a charge of −600 volts and a half life of 7 seconds, and furthermore, after washed 10 times in an ordinary manner, showed a charge of −700 volts and a half life of 5 seconds without catching a tobacco ash.

EXAMPLE 7

Polyethylene terephthalate was prepared by a customary polymerisation method. After the completion of polymerisation, 1.5% by weight of polyethylene oxide with a molecular weight of 500,000 and 0.5% by weight of dodecylbenzenesulfonic acid calcium salt were mixed with polyethylene terephthalate, and polymer chips were obtained in a customary manner. The chips were spun and drawn in a customary manner to make filaments having a tenacity of 3.8 g./d. and an elongation of 21%. A knitted fabric made from these filaments was boiled off in a customary manner. The testing of the so treated knitted fabric revealed that it had a frictional charge of −900 volts and a half life of 8 seconds.

On the other hand, the filaments made from a composition consisting of the same polyethylene terephthalate and 3.0% by weight of dedecylbenzenesulfonic acid sodium salt did not show antistatic effect, and vigorously caught a tobacco ash when rubbed with wool.

EXAMPLE 8

In the same manner as in Example 6, 1.9% by weight of polypropylene glycol having a molecular weight of 3,000 and 0.7% by weight of nonyldiphenylether sulfonic acid sodium salt were incorporated into polyethylene terephthalate. Filaments having a tenacity of 4.2 g./d. and an elongation of 25% were prepared from the resulting composition. The filaments had a frictional charge of −850 volts and a half life of 8 seconds.

EXAMPLE 9

The procedure of Example 6 was repeated except that as the additives, 1.8% by weight of a random copolymer of ethylene oxide with propylene oxide having a molecular weight of 10,000 and 1.0% by weight of octadecylbenzenesulfonic acid sodium salt were used. A knitted fabric obtained had a frictional charge of −450 volts and a half life of 5 seconds, and even after washed 10 times in an ordinary manner, still exhibited a sufficient antistatic effect.

EXAMPLE 10

The method of this invention was applied to polyethylene terephthalate·adipate which had been prepared by substituting adipic acid for 5 mole percent of the acid component of polyethylene terephthalate.

After the completion of polymerisation for polyethylene terephthalate, 1.8% by weight of polyethylene glycol having a molecular weight of 20,000 and 0.7% by weight of dodecylbenzenesulfonic acid sodium salt were added thereto. Filaments were made from the resulting composition. A knitted fabric prepared from these filaments showed a frictional charge of −750 volts and a half life of 6 seconds, and even after washed 10 times, did not show a substantial change in antistatic property with a charge of −800 volts and a half life of 7 seconds.

EXAMPLE 11

Filaments having a total denier of 50 and 24 monofilaments obtained in Example 6 were warped and knitted in a customary manner to make a tricot fabric. The tricot fabric was scoured and finished with a fluorescent dye in a customary manner, and the so treated tricot fabric was sewn into a shirt.

Having a sufficient antistatic ability, the so obtained shirt did not give a cracking sound of electric discharge nor cling around a human body when put on or off. Furthermore, since static charge is hard to occur, it hardly catches dust and becomes dirty. It was confirmed that an excellent antistatic property and resistance to soiling of this shirt were sufficiently maintained even after repetition of an ordinary wearing and washing 46 times.

On the other hand, a tricot shirt made from an ordinary polyethylene terephthalate gave a cracking sound of electricity discharge and cling around a human body when put on or off, and tended to be dirty by collection of dust.

EXAMPLE 12

In the manufacture of polyethylene terephthalate in a customary manner, 2.0% by weight of dodecylbenzenesulfonic acid potassium salt and 2.0% by weight of polyethylene glycol having a molecular weight of 500,000 were added immediately after the completion of an ester-interchange reaction, and the polymerisation was completed by an ordinary method.

The resulting composition was spun and drawn in a customary manner to make filaments. A knitted fabric was made of the obtained filaments, and scoured. It was found that the said knitted fabric had a charge of −800 volts and a half life of 12 seconds.

EXAMPLE 13

In the manufacture of polyethylene terephthalate by a customary method, 2.0% by weight of dinoylbenzenesulfonic acid sodium salt and 3.5% by weight of polyethylene glycol having a molecular weight of 500,000 were added immediately after the ester-interchange reaction, and the polymerisation was completed in a customary manner.

The obtained composition was spun and drawn in a customary manner. A knitted fabric was made of the resulting filaments, and boiled off. This knitted fabric was found to have a charge of −1,000 volts and a half life of 15 seconds.

EXAMPLE 14

In the manufacture of polyethylene terephthalate, 10.0% by weight of dodecylbenzenesulfonic acid potassium salt and 10.0% by weight of polyethylene glycol having a molecular weight of 500,000 were added after the completion of an ester-interchange reaction, and the polymerisation was completed by an ordinary method.

One part by weight of the so obtained polymer chips was mixed with 4 parts by weight of ordinary polyethylene terephthalate chips, and the mixture was spun in a customary manner. A knitted fabric was made of the obtained filaments, and scoured. This knitted fabric showed a charge of —100 volts and a half life of 1 second.

The composition obtained according to this example and the composition of Example 12 contain the same amount of dodecylbenzenesulfonic acid potassium salt and polyethylene glycol, but the present example showed superior results. This means that it is preferable to stock a composition having a high additive content and use it after dilution when necessity arises.

EXAMPLE 15

Modified polyethylene terephthalate chips were obtained by adding 2.0% by weight of dodecylbenzenesulfonic acid sodium salt and 1.5% by weight of polyethylene glycol having a molecular weight of 20,000 immediately after the completion of the polymerisation reaction.

A modified polyethylene terephthalate film was made from these chips in a customary manner. The film had a charge —100 volts and half life of 9 seconds, showing an excellent antistatic ability. An unmodified polyethylene terephthalate film had a charge of —1,100 volts and a half life of more than 120 seconds. The film of the present example readily came off from the roll because of little static charge, but the unmodified polyethylene terephthalate film generated a great quantity of static charge when taken off the roller and caught dust. When both of these films were left to stand in the air, it was found that the unmodified one caught more dust and was more liable to become dirty than the modified one.

What is claimed is:

1. A polyester shaped article in the form of a fiber or film comprising a saturated polyester derived from an aliphatic glycol having incorporated therein (a) at least one polyalkylene ether selected from polyoxyalkylene glycols and polyoxyalkylene glycols in which the terminal hydroxyl group is converted to an ether or ester group, said polyalkylene ether (a) being substantially insoluble in said polyester and incorporated therein in an amount of 0.3–5.0% by weight based on the weight of said polyester, and (b) at least one alkali metal salt or alkaline earth metal salt of an organic sulfonic acid having at least 10 carbon atoms and no ester-forming groups, said salt (b) being incorporated in said polyester in an amount of 0.1–10% by weight based on the weight of said polyester.

2. The article of claim 1 wherein said polyalkylene ether is a polyalkylene ether having a molecular weight of at least 1,000.

3. The article of claim 1 wherein said polyalkylene ether is polyethylene glycol having a molecular weight of 10,000 to 50,000.

4. The article of claim 2 wherein said polyalkylene ether is a copolymer of ethylene oxide and propylene oxide.

5. The article of claim 2 wherein said polyalkylene ether is a copolymer of ethylene oxide and propylene oxide in a proportion of 10/90 to 90/10, said copolymer having a molecular weight of 6,000 to 20,000.

6. The article of claim 5 wherein said alkali metal salt or alkaline earth metal salt is a sodium salt.

7. The article of claim 5 wherein said alkali metal salt or alkaline earth metal salt is a potassium salt.

8. The article of claim 5 wherein said alkali metal salt or alkaline earth metal salt is a calcium salt.

9. The article of claim 1 wherein at least 70 mole percent of said acid component of the polyester consists of terephthalic acid.

10. The composition of claim 1 wherein said organic sulfonic acid is selected from alkylbenzene sulfonic acids, alkyldiphenylether sulfonic acids and alkylphenoxyalkane sulfonic acids.

11. A method of producing a polyester composition having antistatic properties which comprises:
  (1) mixing a saturated polyester derived from an aliphatic glycol with (a) a concentrated amount of a polyalkylene ether substantially insoluble in said polyester, said polyalkylene ether being selected from polyoxyalkylene glycols and polyoxyalkylene glycols in which the terminal hydroxyl group is converted to an ether or ester group and (b) a concenarated amount of an alkali metal salt or alkaline earth metal salt of an organic sulfonic acid having at least 10 carbon atoms and no ester-forming groups; and
  (2) thereafter adding further of said polyester to the resulting mixture to thereby adjust the amounts of said polyalkylene ether and salt of an organic sulfonic acid to 0.5–2.0% by weight and 0.1–5% by weight, respectively, based on the total polyester content.

12. A polyester shaped article in the form of a fiber or film comprising polyethylene terephthalate, at least 70 mole percent of its acid component being terephthalic acid, in which at least one polyalkylene ether selected from the group consisting of polyethylene glycol having a molecular weight of at least 4,000, polypropylene glycol having a molecular weight of at least 1,000, methoxypolyethylene glycol having a molecular weight of at least 1,500 and a copolymer of propylene oxide with ethylene oxide having a molecular weight of at least 1,500 and at least one salt of sulfonic acid selected from the group consisting of sodium salts, potassium salts and calcium salts of alkylbenzenesulfonic acids, alkyldiphenylether sulfonic acids and alkylphenoxyalkane sulfonic acids are incorporated, the said polyalkylene ether and the said sulfonic acid salt being present in an amount of 0.5 to 2.0% by weight and 0.1 to 5% by weight, respectively, based on the polyethylene terephthalate.

References Cited

UNITED STATES PATENTS

| | | | |
|---|---|---|---|
| 2,738,324 | 3/1956 | Hood | 252—8.7 |
| 3,190,763 | 6/1965 | Schleede | 106—186 |
| 3,329,557 | 7/1967 | Magat | 260—873 |

FOREIGN PATENTS

| | | | |
|---|---|---|---|
| 956,833 | 4/1964 | Great Britain | 260—860 |

PAUL LIEBERMAN, Primary Examiner

U.S. Cl. X.R.

260—28, 33.2, 47, 75